P. FORSCHLER.
VEHICLE.
APPLICATION FILED JUNE 1, 1908.

919,337.

Patented Apr. 27, 1909.
2 SHEETS—SHEET 1.

Witnesses
L. E. Wilson.
J. J. Sheehy Jr.

Inventor
P. Forschler.
By James J. Sheehy
Attorney

P. FORSCHLER.
VEHICLE.
APPLICATION FILED JUNE 1, 1908.

919,337.

Patented Apr. 27, 1909.
2 SHEETS—SHEET 2.

UNITED STATES PATENT OFFICE.

PHILIP FORSCHLER, OF NEW ORLEANS, LOUISIANA.

VEHICLE.

No. 919,337.  Specification of Letters Patent.  Patented April 27, 1909.

Application filed June 1, 1908. Serial No. 436,091.

*To all whom it may concern:*

Be it known that I, PHILIP FORSCHLER, citizen of the United States, residing at New Orleans, in the parish of Orleans and State of Louisiana, have invented new and useful Improvements in Vehicles, of which the following is a specification.

My invention pertains to vehicles; and it has for its object to provide a vehicle comprising a body, axles, and springs, all constructed and relatively arranged in such manner that the body is efficiently cushioned by the springs and at the same time is located close to the ground.

Figure 1:
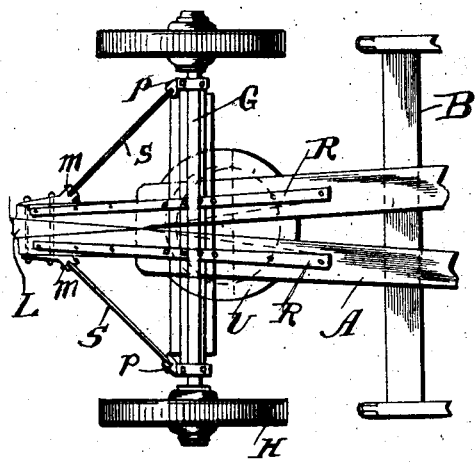
Figure 1:
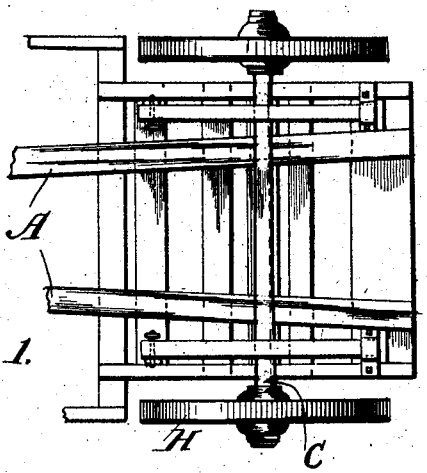
Figure 2:
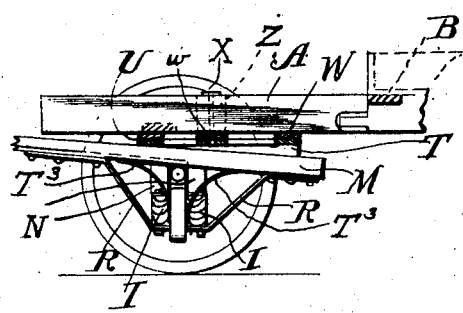
Figure 2:
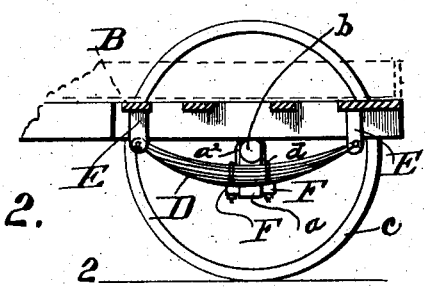
Figure 3:
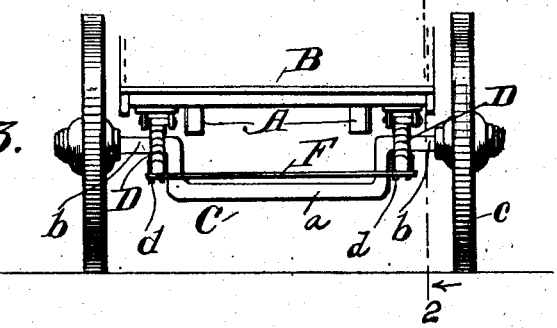
Figure 4:
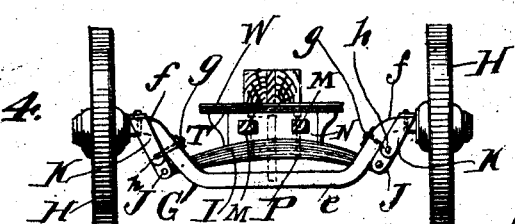
Figure 5:
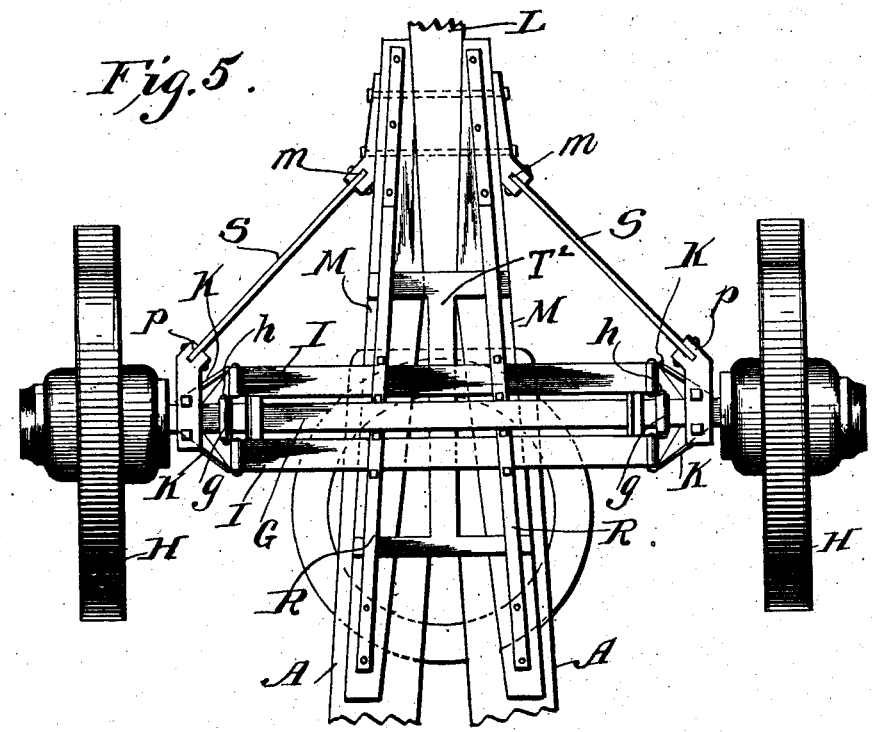
Figure 6:
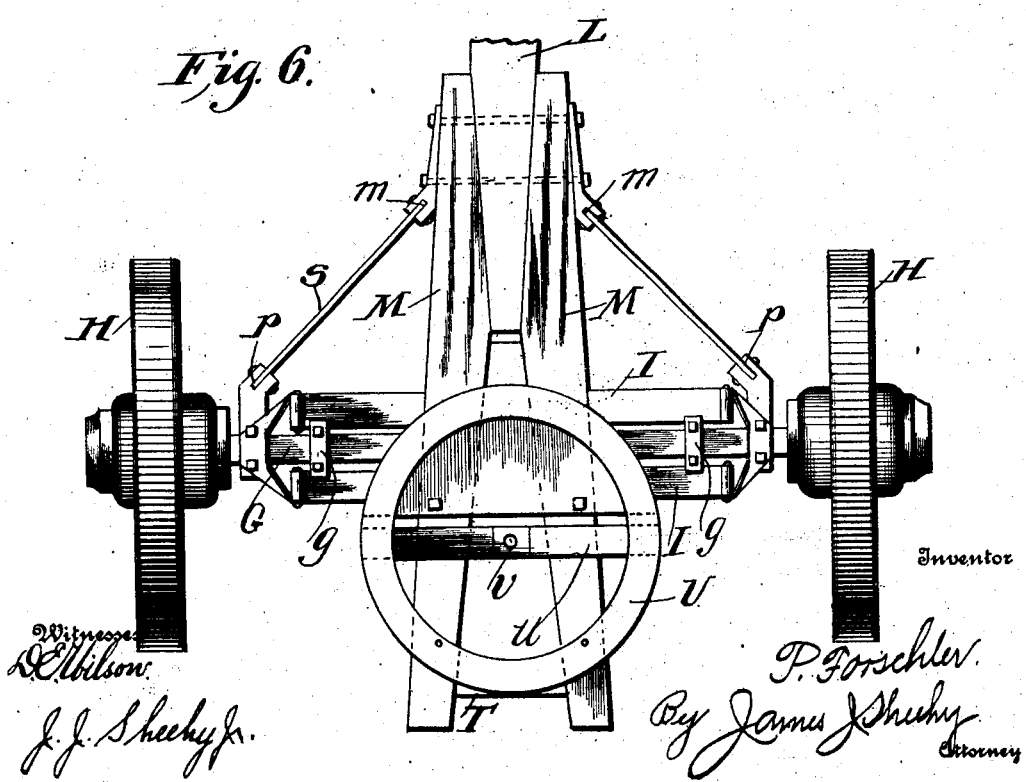

Other advantageous features of the invention will be fully understood from the following description and claims when the same are read in connection with the drawings, accompanying and forming part of this specification, in which:

Figure 1 is a broken, inverted plan of the wagon constituting the best practical embodiment of my invention of which I am aware. Fig. 2 is a broken, longitudinal vertical section of the wagon, showing the same in position for use. Fig. 3 is a view illustrating the arrangement of the rear axle of the vehicle relative to the body and the rear springs. Fig. 4 is a detail transverse section showing the relative arrangement of the front axle, the front springs and the body. Fig. 5 is an inverted plan view, on an enlarged scale, of the forward portion of the vehicle. Fig. 6 is an enlarged view in plan of the forward portion of the vehicle with certain parts omitted as hereinafter set forth.

Similar letters designate corresponding parts in all of the views of the drawings, referring to which:

A A are forwardly converged bars, preferably of wood, upon which is fixed a body B, also preferably of wood, which body may be of the construction illustrated or of any other construction consonant with the purpose of my invention.

C is the rear axle of the vehicle which comprises an intermediate portion $a$, and end portions $b$ disposed about the proportional distance illustrated above the intermediate or drop portion $a$ and designed to carry traveling wheels $c$.

D D are longitudinally disposed springs which are pivotally connected at their ends to hangers E, fixed with respect to the body B, and have their intermediate portions disposed below and clipped at $a^2$ or otherwise connected to the end portions $b$ of the axle, as shown. Disposed at opposite sides of and parallel to the drop portion $a$ of the axle C are metallic bars F which are connected at $d$ to the springs D and are arranged below the same. The said bars F serve by virtue of their connection to the springs and their arrangement at opposite sides of and close to the drop portion $a$ of the axle, to prevent spreading of the axle—*i. e.*, movement of the drop portion of the axle in either direction from the perpendicular. It will also be noted at this point that the said bars F contribute to the strength and durability of the connection between the rear axle and the springs D and are desirable for such reason.

G is the forward axle of the vehicle, which comprises a drop portion $e$ and end portions $f$. H H are wheels mounted on the said end portions $f$ of the forward axle, and I I are transversely disposed springs arranged at opposite sides of the drop portion $e$ of said axle. The said springs I are pivotally connected to hangers J which, in turn, are pivotally connected to eye-bolts $g$ fixed in the sides of the drop portion $e$; and in order to lend additional strength between the said hangers J and the axle I provide the auxiliary hangers K which are connected to the end portions $f$ of the axle and are also connected to the pintles $h$ through which the hangers J and eye-bolts $g$ are connected. Thus it will be manifest that the springs I are connected in a strong and durable manner with the axle G, and at the same time the springs are free to move down and up with respect to the axle incidental to loading and unloading of the vehicle.

L is the vehicle tongue, and M M are hounds fixed to the said tongue and extending above the drop portion of the axle G and also above the springs I, and connected with the said springs by blocks N and bolts P, as best shown in Fig. 4. The said hounds M are also connected through metal straps or braces R with the under sides of the springs I, after the manner best shown in Figs. 2 and 5. I also prefer to connect the hounds M with the forward axle G through the medium of braces S which are pivotally connected at $m$ and $p$ with the hounds and axle, respectively, and are designed to prevent shifting of the axle with respect to the hounds and in that way avoid the imposition of undue strain on the springs I.

T is a plate fixed to the hounds M, and extending at its rear end above the same.

T² is a metallic brace connected to the under side of the hounds, as best shown in Fig. 5.

T³, T³, Fig. 2, are stays between the hounds M and the forward axle.

U is a fifth wheel member fixed on the plate T and having a cross-bar u in which is a vertically disposed aperture v. W is an upper fifth wheel member arranged at the under side of and fixed to the bars A and having a cross-bar w, Fig. 2, in which is an aperture registered with the said aperture v, and X is a king bolt extending through the said apertures of the fifth wheel members U and W and also through the block Z between the forward portions of the bars A, and pivotally connecting the fifth wheel members together, and also pivotally connecting the lower fifth wheel member U with the bars A. By virtue of this construction and relative arrangement of parts it will be manifest that the fifth wheel members U and W are coupled in rear of and out of center with the forward axle G, and consequently the vehicle is adapted to make a short turn, as is desirable.

It will be gathered from the foregoing that by virtue of the construction of my novel vehicle as a whole the body is carried quite close to the ground, but notwithstanding this the body is cushioned in an efficient manner when the vehicle is loaded and also when it is not loaded.

As before stated, the construction herein illustrated and described constitutes the best practical embodiment of my invention of which I am aware, but it is obvious that in the future practice of the invention such changes in the form, and arrangement of parts may be made as fairly fall within the scope of my invention as defined in the claims appended.

Having described my invention, what I claim and desire to secure by Letters-Patent, is:

1. The combination in a vehicle, of a body, a rear axle bearing traveling wheels and having an intermediate drop portion, longitudinally-disposed springs connected at their ends with the body and connected at their middles with the comparatively-high end portions of the axle, and transverse bars F extending between and connected at their ends to the springs and arranged in front and rear of and adjacent to the drop portion of the axle, substantially as and for the purpose set forth.

2. The combination in a vehicle, of a body, hangers on the rear portion thereof, a rear axle bearing traveling wheels and having an intermediate drop portion, longitudinally-disposed springs connected at their ends to the said hangers and having their middle portions disposed under the comparatively-high end portions of the axle, clips connecting the springs and said end portions of the axle, and transverse bars F extending between and connected at their ends to the springs and arranged in front and rear of and adjacent to the drop portion of the axle, substantially as and for the purpose set forth.

3. The combination in a vehicle, of a forward axle having comparatively-high end portions bearing traveling wheels and also having an intermediate drop portion, springs arranged in front and rear of and parallel to the drop portion of the axle, hangers connected to the ends of the springs and the sides of the drop portion of the axle, auxiliary hangers connected to the first named hangers and the comparatively-high end portions of the axle, hounds arranged above the springs, blocks connected with the springs and hounds, metal straps connecting the hounds with the undersides of the springs and extending fore and aft of the latter, and a body connected with the hounds at a point in rear of the vertical plane of the forward axle, substantially as and for the purpose set forth.

In testimony whereof I have hereunto set my hand in presence of two subscribing witnesses.

PHILIP FORSCHLER.

Witnesses:
LOUIS N. BRYANT,
GEO. N. KENDALL.